US010931938B2

(12) United States Patent
Hulsey et al.

(10) Patent No.: US 10,931,938 B2
(45) Date of Patent: Feb. 23, 2021

(54) METHOD AND SYSTEM FOR STEREOSCOPIC SIMULATION OF A PERFORMANCE OF A HEAD-UP DISPLAY (HUD)

(71) Applicant: The Boeing Company, Chicago, IL (US)

(72) Inventors: Daniel Eric Hulsey, Florissant, MO (US); Paul Anway, St. Louis, MO (US)

(73) Assignee: The Boeing Company, Chicago, IL (US)

( * ) Notice: Subject to any disclaimer, the term of this patent is extended or adjusted under 35 U.S.C. 154(b) by 995 days.

(21) Appl. No.: 14/533,749

(22) Filed: Nov. 5, 2014

(65) Prior Publication Data

US 2016/0127718 A1 May 5, 2016

(51) Int. Cl.
*H04N 13/344* (2018.01)
*H04N 13/383* (2018.01)
*G02B 27/01* (2006.01)

(52) U.S. Cl.
CPC ......... *H04N 13/344* (2018.05); *H04N 13/383* (2018.05); *G02B 27/017* (2013.01);
(Continued)

(58) Field of Classification Search
CPC .............. G02B 27/01; G02B 2027/014; G02B 27/017; G02B 2027/0141;
(Continued)

(56) References Cited

U.S. PATENT DOCUMENTS 7,423,673 B1 * 9/2008 Efrat ...................... G02B 27/01
348/222.1
8,446,433 B1 * 5/2013 Mallet ..................... G06T 5/006
345/581
(Continued)

OTHER PUBLICATIONS

Warren Robinett, Jannick P. Rolland, A computational model for the stereoscopic optics of a head-mounted display, Presence: Teleoperators and Virtual Environments, v.1 n.1, p. 45-62, Winter 1992.*
(Continued)

*Primary Examiner* — Daniel Chang
(74) *Attorney, Agent, or Firm* — McDonnell Boehnen Hulbert & Berghoff LLP

(57) ABSTRACT

Methods and systems for simulating performance of a head-up display (HUD) are provided. An example method comprises receiving images of symbology for display by a head-up display, generating distortions to the images as perceived from observer locations through the head-up display, and the distortions are based on design characteristics of an optical component of the head-up display with respect to a model of a projection of the images. The method also includes applying the distortions to the images to generate modified images, and the modified images represent a view of the head-up display corresponding to respective observer locations. The method further includes providing, for stereoscopic display, the modified images overlaying onto a background image. An example system comprises a storage device, a head tracking device to determine the observer location, and a projector to project the modified images onto a display corresponding to the determined observer location.

20 Claims, 4 Drawing Sheets

(52) U.S. Cl.
CPC .... *G02B 27/0172* (2013.01); *G02B 2027/011* (2013.01); *G02B 2027/014* (2013.01); *G02B 2027/0134* (2013.01); *G02B 2027/0178* (2013.01)

(58) Field of Classification Search
CPC ......... G02B 2027/0134; H04N 13/044; H04N 13/0484; H04W 12/06; H04W 12/08; H04W 36/0005; H04W 36/32; H04W 36/34; H04W 48/02; H04W 48/04; H04W 4/003; H04W 4/046; H04W 4/12; H04W 4/206; H04W 76/021; H04W 84/005; G06K 9/6206; G06F 3/011; G06T 5/006
USPC ............... 345/7, 8, 205, 419, 633, 636, 581; 348/115, 121, 148, 222.1, 53; 359/465; 434/38; 382/141
See application file for complete search history.

(56) References Cited

U.S. PATENT DOCUMENTS

| | | | | |
|---|---|---|---|---|
| 2003/0076280 | A1* | 4/2003 | Turner | G09B 9/302 345/7 |
| 2006/0250322 | A1* | 11/2006 | Hall | G02B 27/0172 345/8 |
| 2007/0127121 | A1* | 6/2007 | Maximus | G02B 26/007 359/465 |
| 2010/0086191 | A1* | 4/2010 | Freeman | G06K 9/6206 382/141 |
| 2010/0141555 | A1* | 6/2010 | Rorberg | G02B 27/017 345/8 |
| 2011/0183301 | A1* | 7/2011 | Turner | G09B 9/302 434/43 |
| 2011/0286614 | A1* | 11/2011 | Hess | H04S 7/303 381/302 |
| 2013/0128012 | A1* | 5/2013 | Turner | G06F 3/011 348/53 |
| 2013/0162630 | A1* | 6/2013 | Kim | H04N 13/0468 345/419 |

OTHER PUBLICATIONS

Bagassi et al., "Innovation in Man Machine Interfaces: Use of 3D Conformal Symbols in the Design of Future HUDS (Heads Up Displays)", ICAS 2012, 28th International Congress of the Aeronautical Sciences, pp. 1-10.

* cited by examiner

US 10,931,938 B2

METHOD AND SYSTEM FOR STEREOSCOPIC SIMULATION OF A PERFORMANCE OF A HEAD-UP DISPLAY (HUD)

FIELD

The present disclosure relates generally to a head-up display, and examples of such displays that project relevant information into a line of sight of an observer. In further examples, methods and systems enabling simulation and evaluation of performance of head-up displays are provided.

BACKGROUND

A head-up display or heads-up display, also referred to as a HUD, includes a transparent display that presents data without requiring users to look away from their usual viewpoints allowing users to simultaneously view the data and items in a field of view. A HUD system generally includes a projector unit, a combiner, and a video generation computer. The projection unit includes an optical system, and the combiner is typically an angled flat piece of glass located in front of the viewer that redirects a projected image from the projector in such a way as to see a field of view and the projected image at the same time. The video generation computer provides an interface between the projection unit and systems/data to be displayed and generates imagery and symbology to be displayed by the projection unit.

It can be difficult to judge a performance of a HUD system under development without viewing images from an actual prototype, but prototyping is a time consuming and costly process, and usually occurs late in the development of the system and can further consume a large amount of resources. Thus, evaluating the performance and/or quality of a HUD system prior to actually building a prototype HUD is desired to allow problems to be caught early, saving time and money.

Current techniques for evaluating the performance of an optical system for a HUD may involve evaluation of certain design parameters. Design techniques aim to understand or evaluate the performance of a HUD system based on known design parameters or analysis performed on a computer model. Understanding an output of the computer model (e.g., optical models) can be complicated by the fact that the HUD has a large output beam, and only a small portion of the output beam is sampled by observer's eyes at any given head location. The performance typically changes with head motion in various combinations of losses in field of view, distortions, symbology shifting, and parallax (differences between what the two eyes see), which may be unable to be visualized.

SUMMARY

In one example, a method is provided comprising receiving an image of symbology for display by a head-up display, and generating, by one or more processors, distortions to the image as perceived from a plurality of observer locations through the head-up display. The distortions are based on design characteristics of an optical component of the head-up display with respect to a model of a projection of the image. The method also includes applying, by the one or more processors, the distortions to the image to generate an array of modified images, and the modified images represent a view of the head-up display corresponding to respective observer locations. The method also includes providing, for stereoscopic display, the modified images overlaying onto a background image.

In another example, a non-transitory computer readable medium having stored thereon instructions that, upon executed by a computing device, cause the computing device to perform functions is provided. The functions comprise receiving an image of symbology for display by a head-up display, and generating distortions to the image as perceived from a plurality of observer locations through the head-up display. The distortions are based on design characteristics of an optical component of the head-up display with respect to a model of a projection of the image. The functions also include applying the distortions to the image to generate an array of modified images, and the modified images represent a view of the head-up display corresponding to respective observer locations. The functions further include providing, for stereoscopic display, the modified images overlaying onto a background image.

In still another example, a system is provided that comprises a storage device, a head tracking device, a projector, and a real-time image playback engine. The system may include additional (optional) features such as one or more processors as well. The storage device includes a plurality of modified images of symbology for display by a head-up display, and a respective modified image corresponds to an image of symbology as perceived from an observer location through the head-up display distorted by ray angle errors resulting from design characteristics of an optical component of the head-up display. The head tracking device determines the observer location, and the projector is capable of displaying stereoscopic images. The real-time image playback engine is communicatively coupled to the storage device, to the head tracking device (via the processor, for example), and to the projector, and the real-time image playback engine is configured to receive the determined observer location and to send to the projector one or more of the plurality of modified images corresponding to the determined observer location.

The features, functions, and advantages that have been discussed can be achieved independently in various embodiments or may be combined in yet other embodiments further details of which can be seen with reference to the following description and drawings.

BRIEF DESCRIPTION OF THE FIGURES

The novel features believed characteristic of the illustrative embodiments are set forth in the appended claims. The illustrative embodiments, however, as well as a preferred mode of use, further objectives and descriptions thereof, will best be understood by reference to the following detailed description of an illustrative embodiment of the present disclosure when read in conjunction with the accompanying drawings, wherein:

DETAILED DESCRIPTION

Disclosed embodiments will now be described more fully hereinafter with reference to the accompanying drawings, in which some, but not all of the disclosed embodiments are shown. Indeed, several different embodiments may be provided and should not be construed as limited to the embodiments set forth herein. Rather, these embodiments are provided so that this disclosure will be thorough and complete and will fully convey the scope of the disclosure to those skilled in the art.

Within examples, systems and methods for simulating performance of a head-up display (HUD) are described, which may be useful for purposes of evaluating performance of optical components of a HUD prior to building a prototype of the hardware. Simulation and visualization of performance may reduce or avoid costs with building hardware for the HUD.

Example systems and methods for visualizing performance of the HUD are based on computer modeling of a design of the HUD. The systems produce a stereoscopic display of a view through the HUD that responds to motions of observers to show a view from an actual observation point. Views are generated and stored during pre-processing, and then presented in real-time on a 3D projection display with head tracking.

Within examples, pre-processing generates a number of views, and each view corresponds to a viewpoint through the HUD based on a position or location of the observer. The views include model images that are distorted to consider design parameters of the HUD. The views are stored, and subsequently (e.g., at the time of simulation) a stereoscopic display of a view is generated using the stored views, so as to present a viewpoint as perceived by an observer at a particular location.

Figure 1:
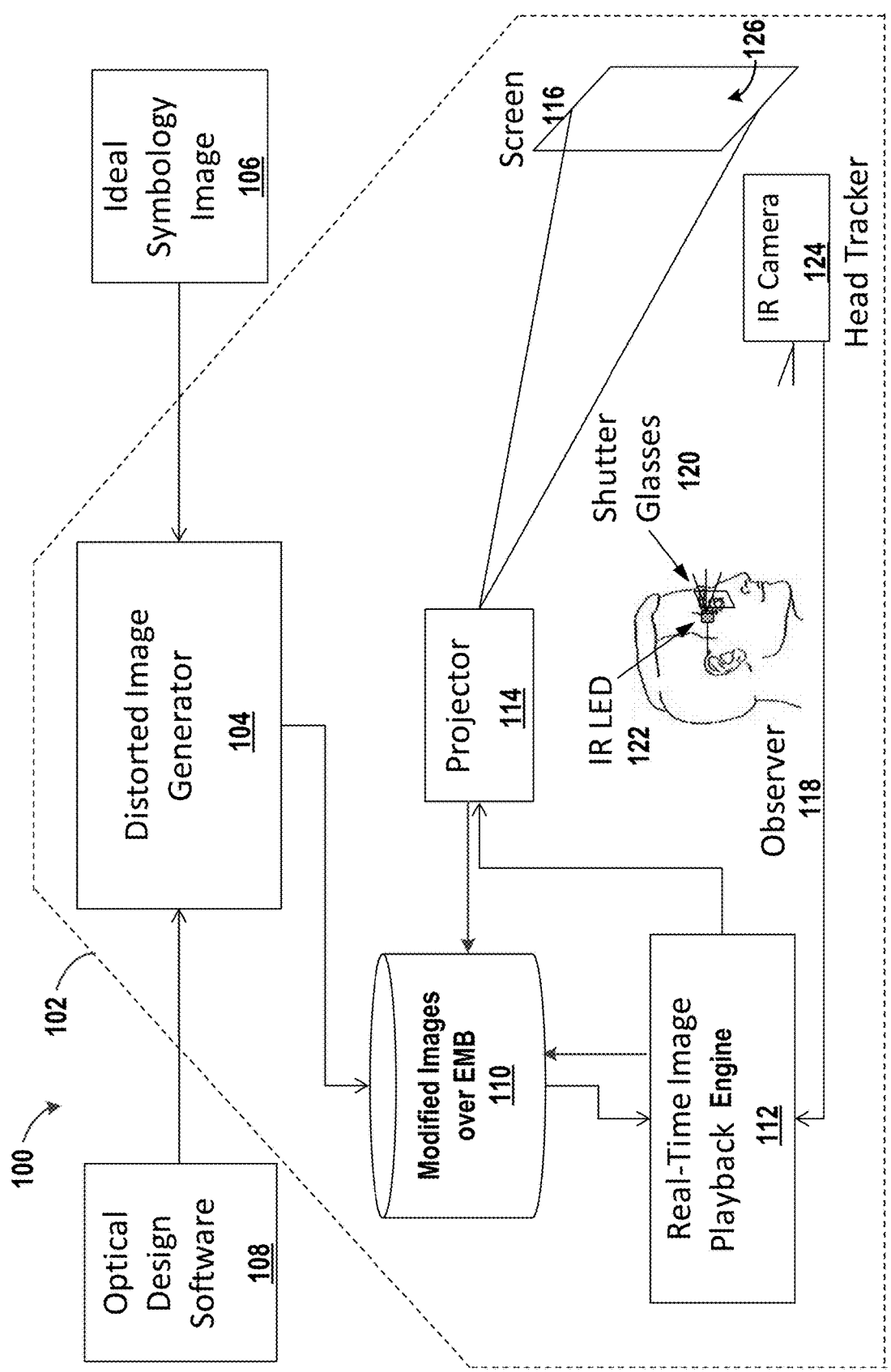
FIG. 1 is a block diagram showing an example system including a head-up display (HUD) simulation within one embodiment.

Referring now to the figures, FIG. 1 is a block diagram showing an example system 100 including a head-up display (HUD) simulation. A HUD simulator 102 includes a distorted image generator 104 that receives ideal symbology images 106 and parameters of characteristics of a design of the HUD from optical design software 108, and generates distorted images for display. The HUD simulator 102 further includes a database 110 storing an array of images over an eye motion box (EMB) received from the distorted image generator 104, a real-time image playback engine 112 coupled to the database 110, and a projector 114 coupled to the real-time image playback engine 112. The HUD simulator 102 further includes a screen or display 116 onto which images are projected by the projector 114.

The ideal symbology images 106 may include images or graphics to display any type of information. For example, for aircraft HUDs, information such as airspeed, altitude, a horizon line, heading, turn/bank and slip/skid indicators any of which may include text, numbers, or graphics may be utilized as symbology images. Other symbols and data may also be available in the HUE) simulator 102 including a boresight or waterline symbol fixed on the display to show where a nose of the aircraft is pointing, a flight path vector (FPV) or velocity vector symbol, an acceleration indicator or energy cue, an angle of attack indicator to show an angle of the wing relative to airflow, or other navigation data and symbols based on data from flight guidance systems.

The optical design software 108 outputs parameters of characteristics of a design of the HUD. For example, the optical design software 108 may be utilized to design a HUD considering optical components of the HUD. Many factors may be considered that affect parameters of the HUD. Such parameters may include a field of view (FOV) of the HUD that indicates angle(s), vertically as well as horizontally, subtended at an eye of the observer, that the projector displays symbology in relation to an outside view. A narrow FOV indicates that the view through the display (of an environment, for example) might include little additional information beyond perimeters of the environment, whereas a wide FOV would allow a broader view. Because human eyes are separated, each eye receives a different image, and images projected by the HUD simulator 102 are viewable by one or both eyes.

Other parameters include collimation of the projected image that makes light rays parallel, and angles of projection of the light rays. Because the light rays are parallel, the human eye focusses on infinity to receive a clear image. Collimated images are perceived as existing at or near optical infinity. This means that an observer does not need to refocus to view the outside world and the HUD display. When the angles of projection of the light rays are not parallel, and some rays are projected offset from parallel resulting in ray trace errors, perception of the images is distorted.

Still other parameters include a size of an eyebox, or eye motion box (EMB). For example, an optical collimator of the projector 114 produces a zone of parallel light so the projected images can only be viewed while eyes of an observer are located somewhere within that volume. The volume is often referred to as a three-dimensional area called the EMB. Example HUD eyeboxes may be about 5 lateral by 3 vertical by 6 longitudinal inches. This allows the observer some freedom of head movement, but movement too far up/down left/right will cause the display to vanish off an edge of the collimator and movement too far back will cause the display to crop off around the edge (vignette).

Still further parameters include luminance and contrast enabling adjustments to account for ambient lighting, which can vary widely (e.g., from glare of bright clouds to moonless night approaches to minimally lit fields), scaling of displayed images to present a picture that overlays the outside environment in a 1:1 relationship.

The distorted image generator 104 receives the design parameters of the HUD from the optical design software 108, and modifies the ideal symbology images 106 based on the design parameters. As one example, the distorted image generator 104 outputs modified images corresponding to an image of symbology as perceived from an observer location through the head-up display distorted by ray angle errors resulting from design characteristics of an optical component of the head-up display.

Within an example, the distorted image generator 104 receives ray trace data from the optical design software for an optical model of the HUD, and produces an array of images of symbology (using data of the ideal symbology images 106) as the array of images would look through the HUD from different points of view using actual performance and distortions of the optics.

Figure 2:
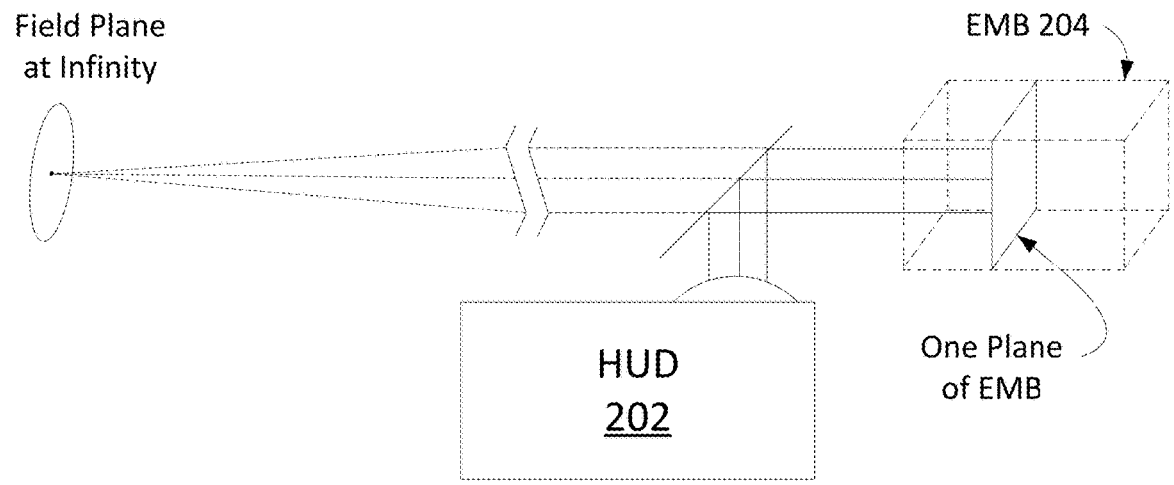
FIG. 2 illustrates an optical model of the HUD with an example illustration of ray trace data within one embodiment.
Figure 2:
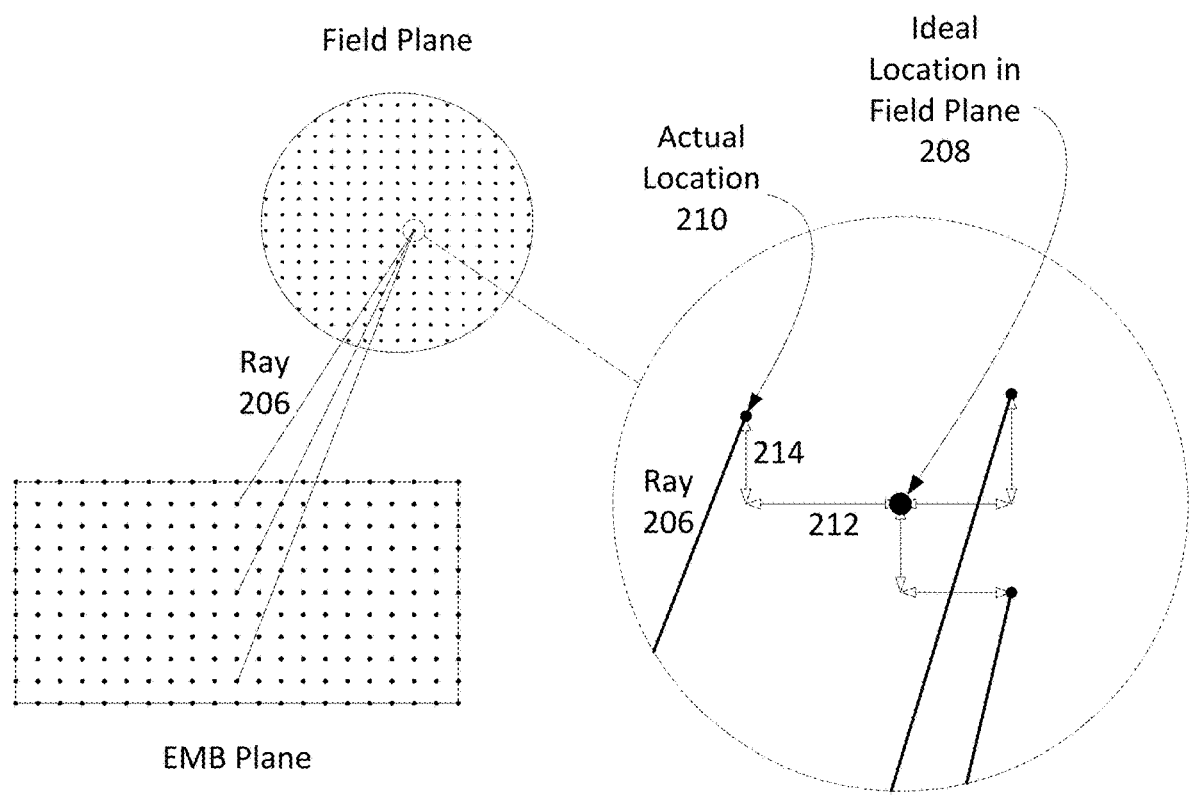

FIG. 2 illustrates an optical model of the HUD with an example illustration of ray trace data. Rays of projected light from a HUD 202 have ideal locations (angles) in the field plane at infinity, but real path through lens or optical components can result in errors. From a given point in the HUD 202 image source, rays are projected toward an eye motion box (EMB) 204, and when ideal, rays are all parallel and in the same direction. However, due to manufacturing tolerances of optics, design characteristics, or other imperfections, optical components may cause some error resulting in rays not exactly parallel to each other. FIG. 2 illustrates an example ray 206 with ideal angle (location in field plane) 208 and actual angle 210 resulting in horizontal and vertical errors 212 and 214 respectively.

In this example, rays are traced from a grid of points in the image source (corresponding, for example, to 1° horizontal and vertical spacing in the field plane) to a grid of points in the eye motion box 204 (for example, 0.25 inch horizontal and vertical spacing and 1.0 inch longitudinal spacing in the EMB 204). So, for each sample point in the EMB 204, horizontal and vertical errors are calculated by the optical design software for each sample point in the field plane. These ray errors are provided to the distorted image generator 104 in FIG. 1, for example.

The distorted image generator 104 uses the collection of errors in projected rays for each different horizontal and vertical location of the field plane and makes a collection of distorted images from all points of view of an eye motion box 204. The eye motion box 204 indicates a range of an area within which an observer resides to view the projected images. Thus, the distorted image generator 104 iterates through each sample location in the eye motion box 204, and at each location, uses the collection of ray errors from that point to every sample point in a field of view (FOV) of the observer to distort the ideal image. Within one example, the FOV may be 28 degrees wide by 24 degrees tall, and an array of points in the FOV of every horizontal and vertical degree are sampled.

The ray errors are applied to each pixel of the ideal image to generate the distorted image of the view from a given point in the EMB 204. Because the ideal image is typically sampled more finely than the ray data, the ray error at each pixel is calculated by curve fitting and interpolation between the field plane grid points. Each pixel's location in the distorted image is shifted by the calculated error from the ideal location. Pixels that are shifted by something other than an integer multiple of the pixel pitch are split between the closest pixels in the distorted image according to the distance from each pixel center, for example.

A portion of the ideal image that is visible from any given location in the EMB 204 is limited by the HUD instantaneous field of view (IFOV) from that location. Information about that IFOV is included in the ray error data because rays will not be traced outside of the IFOV. Boundaries of the distorted images may be applied by the distorted image generator 104 by using a smoothing function to interpolate between the field plane grid locations where the data stops. Alternatively, the optical design software could supply an IFOV mask for each grid point in the EMB 204, for example.

The database 110 stores an array of images over the EMB including the resulting modified or distorted images received from the distorted image generator 104. Within the database 110, pairs of images are stored and associated together so as to store an image to present to a right eye and an image to present to a left eye as a pair of images. In addition, the database 110 indexes the pair of images with a horizontal and vertical location in the eye motion box 204 of the HUD so as to associate the pair of images with a location to be displayed in the eye motion box 204. In other examples, the database may index the pair of images to correspond to images for display according to a location of an observer (described more fully below).

The real-time image playback engine 112 determines images from the database 110 to be displayed. Images are selected and played back during the real-time simulation in a video format, but instead of having a predetermined sequence of frames, appropriate images are selected for display according to locations of the observer. Thus, the system 100 illustrates an observer 118 wearing shutter glasses 120 that includes one or multiple infrared (IR) LEDs 122, which may be detected by or communicate with an IR camera 124. The IR camera 124 is communicatively coupled (wired or wirelessly) to the real-time image playback engine 112. The IR camera 124 can determine a location of the observer 118, or more particularly, a location of the IR LED 122 on the shutter glasses 120 to associate such location with a location of the observer 118, and provide the location to the real-time image playback engine 112. The real-time image playback engine 112 then selects images from the database 110 that are mapped to the location, and provide the selected images to the projector 114 for projection onto the screen 116.

The shutter glasses 120 enable stereoscopic viewing. Two images for two eyes are displayed, and the IR LED 122 on the shutter glasses 120 enable the IR camera 124, focused on the shutter glasses 120, to determine a head location (e.g., head tracker) and provide that location to the playback engine 112 to pick out images corresponding to a view of where the head of the observer is located, and where each eye is located, so as the observer 118 moves his or her head, projections of images change as well to a view of what would be seen in the EMB 204. Thus, within examples, the IR LED 112 worn by the observer 118 may be considered a head tracking device, or alternatively, the IR LED 122 and the IR camera 124 may be considered a head tracking device.

The projector flashes images for a left eye and a right eye and alternates between the two images. The shutter glasses 120 alternate a shutter mechanism synchronized with projector operation to enable a left eye and a right eye to view an appropriate image. A transmitter (not shown) on the screen 116 transmits signals between the shutter glasses 120 and the projector 114 to maintain synchronization. The projector can be operation at 120 Hz, for example, and each eye views an image flashing at 60 Hz, for example.

The projector 114 thus is communicatively coupled to the real-time image playback engine 112 which receives the determined observer location from the head tracking device and chooses the proper image pair from the database 110 to send to the projector 114 for projection onto the screen 116 corresponding to the determined observer location. The projector projects pairs of images onto the screen 116 stereoscopically so as to simulate distortions to the images as perceived from the observer location through the HUD due to the design characteristics of the optical component of the HUD. Within examples, the HUD simulator may use a different stereoscopic display instead of the projector 114 and the screen 116, such as a 3D LCD display or other types of displays.

Images are thus displayed by choosing a pair of images corresponding to the right and left eye points of view, and displaying them on a stereoscopic display. Updates to the images are determined as the observer 118 moves around to show the view from various locations in the EMB 204. Several image quality features can be seen by the observer 118 including parallax (apparent depth changes and eye strain effects from divergence or dipvergence), symbol position errors, image distortion and changes in distortion (waviness) with head position, and field of view limitation with head position.

As another layer behind the display of symbology, a background image can be determined and is displayed on the screen 116 (e.g., similar to a view of an environment as would be seen in flight) in stereo to provide a reference for depth perception and symbol position accuracy perception of the HUD display. In other examples, the fixed background image may be replaced with a dynamic video background to simulate flight. Using this example implementation, the system 100 can provide a realistic view of how the HUD would perform at a fraction of the cost and schedule of building a prototype.

Within examples, the system 100 is based on a visualization environment to support a layered representation of data. The background image layer displays a computer generated scenario that replicates the view from the flight deck, for instance, and may be an external view layer whereas the HUD layer simulates the transparent display. The external view layer displays terrain and flight environment depending on the selected scenario.

Figure 3:
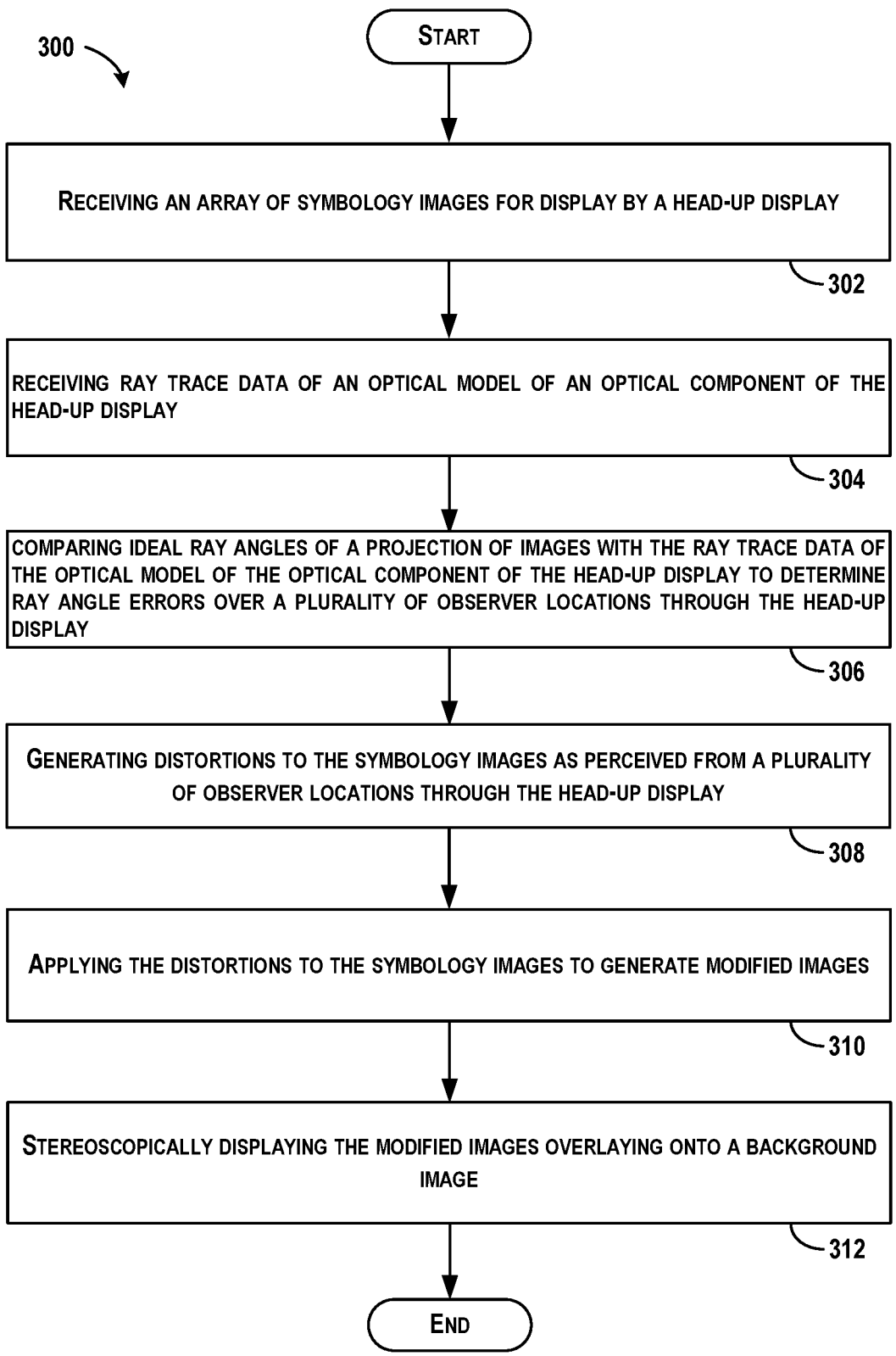
FIG. 3 shows a flowchart of an example method for simulating performance of a head-up display (HUD) within one embodiment.

FIG. 3 shows a flowchart of an example method 300 for simulating performance of a head-up display (HUD). Method 300 shown in FIG. 3 presents an embodiment of a method that, for example, could be used with the system shown in FIG. 1, for example, and may be performed by a computing device (or components of a computing device) such as a client device or a server or may be performed by components of both a client device and a server. Example devices or systems may be used or configured to perform logical functions presented in FIG. 3. In some instances, components of the devices and/or systems may be configured to perform the functions such that the components are actually configured and structured (with hardware and/or software) to enable such performance. In other examples, components of the devices and/or systems may be arranged to be adapted to, capable of, or suited for performing the functions. Method 300 may include one or more operations, functions, or actions as illustrated by one or more of blocks 302-312. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

It should be understood that for this and other processes and methods disclosed herein, flowcharts show functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium or data storage, for example, such as a storage device including a disk or hard drive. The computer readable medium may include non-transitory computer readable medium or memory, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a tangible computer readable storage medium, for example.

In addition, each block in FIG. 3 may represent circuitry that is wired to perform the specific logical functions in the process. Alternative implementations are included within the scope of the example embodiments of the present disclosure in which functions may be executed out of order from that shown or discussed, including substantially concurrent or in reverse order, depending on the functionality involved, as would be understood by those reasonably skilled in the art.

At block 302, the method 300 includes receiving an image of symbology for display by a head-up display.

At block 304, the method 300 includes receiving ray trace data of the optical model of an optical component of the head-up display, and at block 306, the method 300 includes comparing the ideal ray angles of a projection of images with the ray trace data of the optical model of the optical component of the head-up display to determine ray angle errors over a plurality of observer locations through the head-up display. At block 308, the method 300 includes generating, by one or more processors, distortions to the image as perceived from a plurality of observer locations through the head-up display, and the distortions are based on design characteristics of an optical component of the head-up display with respect to a model of a projection of the image. Thus, within examples, ray trace data of the model of the projection of image by the optical component of the head-up display may be received, and ray angle errors can be determined over the plurality of observer locations. The ray angle errors are based on a comparison of the ideal ray angles of a projection of the image with the ray trace data of the model of the projection of images using the design characteristics of the optical component.

At block 310, the method 300 includes applying, by the one or more processors, the distortions to the image to generate an array of modified images, and the modified images represent a view of the head-up display corresponding to respective observer locations. Within examples, optical effects can be applied to the images of symbology including optical effects selected from a group of field of view clipping and shifting of image content. After applying the distortions, the method 300 may include producing a resulting modified image from each point of view in an eye motion box of the head-up display. The eye motion box may represent or include the plurality of observer locations and indicates an area within which an observer resides to view projected images by the head-up display.

At block 312, the method 300 includes providing, for stereoscopic display, the modified images overlaying onto a background image. For example, a stereoscopic display of the plurality of images can be provided so as to present each eye with a respective modified image. The modified images can be overlaid onto a background image, and within some examples, the modified images can alternatively be overlaid onto a changing video background.

Within some examples, the method 300 may be performed to generate the array of modified images and store the modified images for later use. In other examples, the method 300 may be performed, at least in part, in real-time. For instance, the method 300 may additionally include determining one or more given locations of an observer. Generating the distortions at block 304 may then include calculating an array of distortion mappings corresponding to possible distortions to images as perceived from the plurality of observer locations through the head-up display, and applying the distortions to the image to generate the array of modified images at block 306 may include applying, in real-time, the distortions to the image based on the distortion mappings for the one or more given locations of the observer. Thus, an array of distortion mappings can be pre-calculated that could then be applied to images in real-time. The distortion mappings may indicate types of distortions to apply to an image when the observer is at a corresponding location, for example. The types of distortions include luminance and contrast adjustments to account for ambient lighting, scaling of images, blurring of images, etc. Real-time execution of the method may enable symbology video to by input so that the simulated HUD display could be active.

Within some examples, the method 300 further includes associating a first modified image with a second modified image as a pair of images, and the first modified image corresponds to an image to present to a right eye and the second modified image corresponds to an image to present to a left eye. In addition, the method 300 may include indexing the pair of images with a horizontal and vertical location in an eye motion box of the head-up display, and the eye motion box includes the plurality of observer locations and indicates an area within which an observer resides to view projected images by the head-up display. The indexed pair of images can be stored for later retrieval and presentation in real-time on a display.

Figure 4:
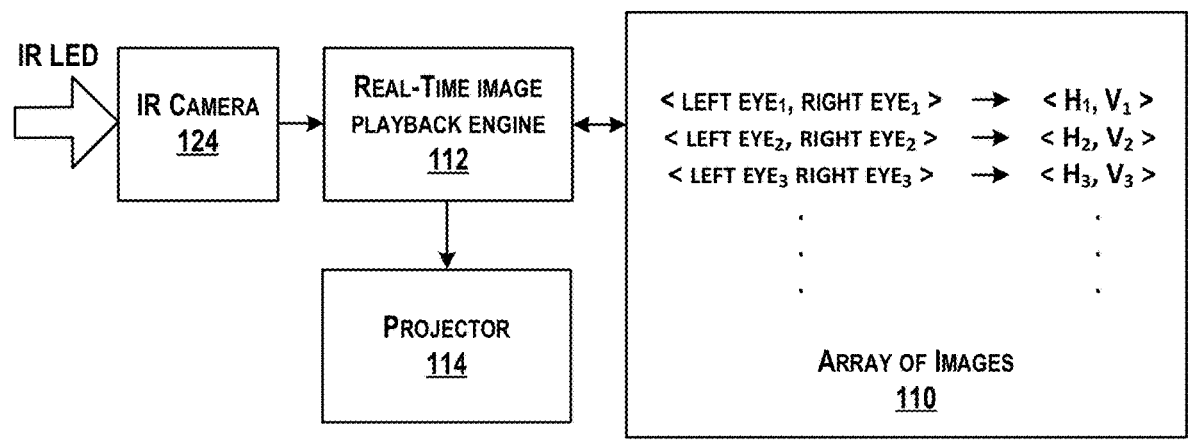
FIG. 4 is a block diagram illustrating an example storage of the images within the array of images within one embodiment.

FIG. 4 is a block diagram illustrating an example storage of the images within the array of images. In FIG. 4, left eye and right eye images are stored as pairs, such that a left eye image for image$_1$ is stored as a pair with a right eye image for image$_1$. In addition, the pairs are indexed to the horizontal and vertical locations (e.g., $H_1$, $V_1$) mapped to views in the eye motion box.

The projector 114 may display the modified images as a video including a sequence of frames selected to represent the view of the head-up display corresponding to respective observer locations. Within examples, the real-time image playback engine 112 receives information indicating motion of a head of an observer from the IR camera 124, determines a pair of images, from the modified images, corresponding to right eye and left eye points of view based on the information indicating motion of the head of the observer or a location of the observer, and provides the pair of images to the projector 114 for display (or provides a pointer to the pair of images, and the projector 114 retrieves the images from the array of images 110 for display). Displaying the images enables simulation of the distortions to the images as perceived from the location of the observer through the head-up display due to the design characteristics of the optical component of the head-up display.

Figure 5:
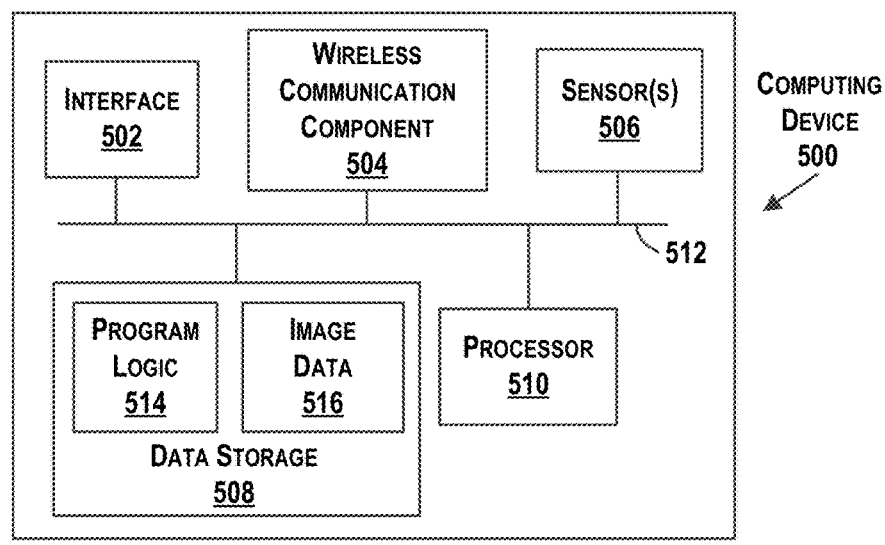
FIG. 5 illustrates a schematic drawing of an example computing device within one embodiment.

As mentioned, portions of the method 300 may be performed by a computing device (or components of a computing device), as well as by components of elements shown in FIG. 1. FIG. 5 illustrates a schematic drawing of an example computing device 500. The computing device 500 in FIG. 5 may represent devices shown in FIG. 1 including the distorted image generator 104, the real-time image playback engine 112, the projector 114, etc., or the computing device 500 may represent the HUD simulator 102 in general. In some examples, some components illustrated in FIG. 5 may be distributed across multiple computing devices. However, for the sake of example, the components are shown and described as part of one example device 500. The computing device 500 may be or include a mobile device, desktop computer, email/messaging device, tablet computer, or similar device that may be configured to perform the functions described herein.

The computing device 500 may include an interface 502, a wireless communication component 504, sensor(s) 506, data storage 508, and a processor 510. Components illustrated in FIG. 5 may be linked together by a communication link 512. The computing device 500 may also include hardware to enable communication within the computing device 500 and between the computing device 500 and another computing device (not shown), such as a server entity. The hardware may include transmitters, receivers, and antennas, for example.

The interface 502 may be configured to allow the computing device 500 to communicate with another computing device (not shown), such as a server. Thus, the interface 502 may be configured to receive input data from one or more computing devices, and may also be configured to send output data to the one or more computing devices. In some examples, the interface 502 may also maintain and manage records of data received and sent by the computing device 500. The interface 502 may also include a receiver and transmitter to receive and send data. In other examples, the interface 502 may also include a user-interface, such as a keyboard, microphone, touchscreen, etc., to receive inputs as well.

The wireless communication component 504 may be a communication interface that is configured to facilitate wireless data communication for the computing device 500 according to one or more wireless communication standards. For example, the wireless communication component 504 may include a Wi-Fi communication component that is configured to facilitate wireless data communication according to one or more IEEE 802.11 standards. As another example, the wireless communication component 504 may include a Bluetooth communication component that is configured to facilitate wireless data communication according to one or more Bluetooth standards. Other examples are also possible.

The sensor 506 may include one or more sensors, or may represent one or more sensors included within the computing device 500. Example sensors include an accelerometer, gyroscope, pedometer, light sensors, microphone, camera, or other location and/or context-aware sensors.

The data storage 508 may store program logic 514 that can be accessed and executed by the processor 510. The data storage 508 may also store collected sensor data or image data 516.

The description of the different advantageous arrangements has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:
1. A method comprising:
receiving an image of symbology for display by a head-up display;
receiving ray trace data of an optical model of an optical component of the head-up display;
comparing ideal ray angles of a projection of images with the ray trace data of the optical model of the optical component of the head-up display to determine ray angle errors over a plurality of observer locations through the head-up display;

generating, by one or more processors, distortions to the image as perceived from the plurality of observer locations through the head-up display using the ray angle errors;
generating an array of modified images by applying the distortions to the image, wherein the array of modified images includes pixel locations shifted by the ray angle errors, wherein the modified images represent a view of the head-up display corresponding to respective observer locations; and
displaying the modified images overlaid onto a background image to simulate performance of displaying the image of symbology by the head-up display using distortions of the optical component so as to display distorted views of the image of symbology.

2. The method of claim 1, wherein generating the array of modified images comprises:
applying optical effects to the image of symbology including optical effects selected from a group of field of view clipping, luminance modification, and shifting of image content.

3. The method of claim 1, wherein generating the array of modified images comprises:
producing a resulting modified image from each point of view in an eye motion box of the head-up display, wherein the eye motion box includes the plurality of observer locations and indicates an area within which an observer resides to view projected images by the head-up display.

4. The method of claim 1, wherein displaying the modified images comprises:
providing a stereoscopic display of the modified images so as to present each eye with a respective modified image.

5. The method of claim 1, wherein displaying the modified images comprises:
associating a first modified image with a second modified image as a pair of images, wherein the first modified image corresponds to an image to present to a right eye and the second modified image corresponds to an image to present to a left eye; and
indexing the pair of images with a horizontal and vertical location in an eye motion box of the head-up display, wherein the eye motion box includes the plurality of observer locations and indicates an area within which an observer resides to view projected images by the head-up display; and
storing the indexed pair of images for presentation in real-time on a display.

6. The method of claim 1, further comprising:
displaying the modified images as a video including a sequence of frames selected to represent the view of the head-up display corresponding to respective observer locations.

7. The method of claim 1, further comprising:
receiving information indicating motion of a head of an observer;
determining a pair of images, from the modified images, corresponding to right eye and left eye points of view based on the information indicating motion of the head of the observer; and
providing the pair of images for display.

8. The method of claim 1, further comprising:
receiving information indicating a location of an observer selected from the plurality of observer locations;
determining a pair of images, from the modified images, corresponding to right eye and left eye points of view and indexed to the location of the observer; and
providing the pair of images for display so as to simulate the distortions to the images as perceived from the location of the observer through the head-up display due to the design characteristics of the optical component of the head-up display.

9. The method of claim 1, further comprising:
determining one or more given locations of an observer;
wherein generating the distortions to the image as perceived from a plurality of observer locations through the head-up display comprises calculating an array of distortion mappings corresponding to possible distortions to images as perceived from the plurality of observer locations through the head-up display; and
wherein generating the array of modified images comprises applying, in real-time, the distortions to the image based on the distortion mappings for the one or more given locations of the observer.

10. A non-transitory computer readable medium having stored thereon instructions that, upon executed by a computing device, cause the computing device to perform functions comprising:
receiving an image of symbology for display by a head-up display;
receiving ray trace data of an optical model of an optical component of the head-up display;
comparing ideal ray angles of a projection of images with the ray trace data of the optical model of the optical component of the head-up display to determine ray angle errors over a plurality of observer locations through the head-up display;
generating distortions to the image as perceived from the plurality of observer locations through the head-up display using the ray angle errors;
generating an array of modified images by applying the distortions to the image, wherein the array of modified images includes pixel locations shifted by the ray angle errors, wherein the modified images represent a view of the head-up display corresponding to respective observer locations; and
displaying the modified images overlaid onto a background image to simulate performance of displaying the image of symbology by the head-up display using distortions of the optical component so as to display distorted views of the image of symbology.

11. The non-transitory computer readable medium of claim 10, wherein generating the array of modified images comprises:
producing a resulting modified image from each point of view in an eye motion box of the head-up display, wherein the eye motion box includes the plurality of observer locations and indicates an area within which an observer resides to view projected images by the head-up display.

12. The non-transitory computer readable medium of claim 10, wherein displaying the modified images comprises:
providing a stereoscopic display of the modified images so as to present each eye with a respective modified image.

13. The non-transitory computer readable medium of claim 10, wherein displaying the modified images comprises:
associating a first modified image with a second modified image as a pair of images, wherein the first modified image corresponds to an image to present to a right eye and the second modified image corresponds to an image to present to a left eye; and indexing the pair of images with a horizontal and vertical location in an eye motion box of the head-up display, wherein the eye motion box includes the plurality of observer locations and indicates an area within which an observer resides to view projected images by the head-up display; and storing the indexed pair of images for presentation in real-time on a display.

14. A system comprising:
a non-transitory computer readable medium storing a plurality of modified images of symbology for display by a head-up display, and a respective modified image corresponds to an image of symbology as perceived from an observer location through the head-up display distorted by shifting pixel locations by ray angle errors resulting from design characteristics of an optical component of the head-up display, wherein the ray angle errors are based on a comparison of ideal ray angles of a projection of the images with ray trace data of an optical model of the optical component of the head-up display;
a camera to determine the observer location;
a projector for displaying stereoscopic images; and
a computing device comprising a processor communicatively coupled to the non-transitory computer readable medium, to the camera, and to the projector, and the computing device configured to receive the determined observer location and to send to the projector one or more of the plurality of modified images corresponding to the determined observer location to simulate performance of displaying the image of symbology by the head-up display using distortions of the optical component so as to display distorted views of the image of symbology.

15. The system of claim 14, wherein the non-transitory computer readable medium associates a first modified image with a second modified image as a pair of images, wherein the first modified image corresponds to an image to present to a right eye and the second modified image corresponds to an image to present to a left eye, and
wherein the non-transitory computer readable medium indexes the pair of images with a horizontal and vertical location in an eye motion box of the head-up display, wherein the eye motion box includes the plurality of observer locations and indicates an area within which an observer resides to view projected images by the head-up display.

16. The system of claim 14, wherein the projector projects the modified images as a video including a sequence of frames selected to represent the view of the head-up display corresponding to respective observer locations.

17. The system of claim 14, wherein the projector receives from the non-transitory computer readable medium a pair of images, from the plurality of modified images, corresponding to right eye and left eye points of view based on the observer location, and projects the pair of images onto a display stereoscopically.

18. The system of claim 14, wherein the projector receives from the non-transitory computer readable medium a pair of images, from the plurality of the modified images, corresponding to right eye and left eye points of view and indexed to the observer location, and
wherein the projector projects the pair of images onto a display so as to simulate distortions to the images as perceived from the observer location through the head-up display due to the design characteristics of the optical component of the head-up display.

19. The non-transitory computer readable medium of claim 10, wherein generating the array of modified images comprises:
applying optical effects to the images of symbology including optical effects selected from a group of field of view clipping, luminance modification, and shifting of image content.

20. The non-transitory computer readable medium of claim 10, further comprising:
displaying the modified images as a video including a sequence of frames selected to represent the view of the head-up display corresponding to respective observer locations.

* * * * *